(12) United States Patent
Borchers et al.

(10) Patent No.: US 9,890,708 B2
(45) Date of Patent: Feb. 13, 2018

(54) POWER PLANT INCLUDING A SECONDARY ENGINE FOR COMPENSATING FOR LOSSES OF POWER FROM MAIN ENGINES IN A ROTARY WING AIRCRAFT

(71) Applicant: AIRBUS HELICOPTERS, Marignane (FR)

(72) Inventors: Guido Borchers, Marseilles (FR); Romain Stephant, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 584 days.

(21) Appl. No.: 14/577,254

(22) Filed: Dec. 19, 2014

(65) Prior Publication Data

US 2015/0176488 A1  Jun. 25, 2015

(30) Foreign Application Priority Data

Dec. 20, 2013  (FR) ..................... 13 03052

(51) Int. Cl.
| | |
|---|---|
| *F02C 6/02* | (2006.01) |
| *F02C 7/32* | (2006.01) |
| *F02C 7/36* | (2006.01) |
| *B64C 27/12* | (2006.01) |
| *F02C 9/42* | (2006.01) |
| *B64D 31/06* | (2006.01) |

(52) U.S. Cl.
CPC ............... *F02C 6/02* (2013.01); *B64C 27/12* (2013.01); *B64D 31/06* (2013.01); *F02C 7/32* (2013.01);

(Continued)

(58) Field of Classification Search
CPC ...... F02C 6/02; F02C 7/32; F02C 7/36; F02C 9/00; F02C 9/42; F01D 13/003;

(Continued)

(56) References Cited

U.S. PATENT DOCUMENTS

| | | |
|---|---|---|
| 3,963,372 A | 6/1976 | McLain et al. |
| 4,177,693 A | 12/1979 | Ivanko et al. |

(Continued)

FOREIGN PATENT DOCUMENTS

| | | |
|---|---|---|
| EP | 2623746 | 8/2013 |
| EP | 2623747 | 8/2013 |

(Continued)

OTHER PUBLICATIONS

French Search Report for FR 1303052, Completed by the French Patent Office on Aug. 6, 2014, 9 Pages.

*Primary Examiner* — Phutthiwat Wongwian
*Assistant Examiner* — Loren Edwards
(74) *Attorney, Agent, or Firm* — Brooks Kushman P.C.

(57) ABSTRACT

A method of managing a power plant for a rotary wing aircraft, said power plant comprising two main engines, a secondary engine, and a main power transmission gearbox (MGB). Said main and secondary engines mechanically driving said MGB so as to rotate a main rotor of said aircraft. Said secondary engine delivers two distinct mechanical power levels so that said main and secondary engines together deliver sufficient mechanical power to enable said aircraft to fly, firstly a first secondary mechanical power $MP_{S1}$ and secondly a second secondary mechanical power $MP_{S2}$ suitable for compensating for a loss of main mechanical power from at least one main engine.

16 Claims, 1 Drawing Sheet

(52) U.S. Cl.
CPC .................. *F02C 7/36* (2013.01); *F02C 9/42* (2013.01); *F05D 2220/329* (2013.01); *F05D 2260/80* (2013.01); *Y02T 50/671* (2013.01)

(58) Field of Classification Search
CPC ....... B64C 27/006; B64C 27/12; B64C 27/26; B64C 19/00; B64D 31/00; B64D 31/06; B64D 41/00; B64D 35/08; B64D 2027/026; F05D 2220/329; F05D 2260/80
USPC ..................................... 60/773, 39.21, 39.15
See application file for complete search history.

(56) References Cited

U.S. PATENT DOCUMENTS

| | | | |
|---|---|---|---|
| 8,283,796 B2* | 10/2012 | Certain | B60K 6/24 290/31 |
| 8,666,568 B2 | 3/2014 | Camhi | |
| 9,038,939 B2* | 5/2015 | Dyrla | B60K 6/00 244/17.11 |
| 2009/0186320 A1* | 7/2009 | Rucci | B64C 27/04 434/33 |
| 2013/0199204 A1 | 8/2013 | Camhi et al. | |
| 2013/0219905 A1 | 8/2013 | Marconi et al. | |
| 2014/0117148 A1 | 5/2014 | Dyrla et al. | |
| 2014/0200844 A1 | 7/2014 | Evrard et al. | |
| 2015/0125258 A1* | 5/2015 | Certain | B64D 35/08 415/1 |

FOREIGN PATENT DOCUMENTS

| | | |
|---|---|---|
| EP | 2623748 | 8/2013 |
| EP | 2724939 | 4/2014 |
| WO | 2012059671 | 5/2012 |

* cited by examiner

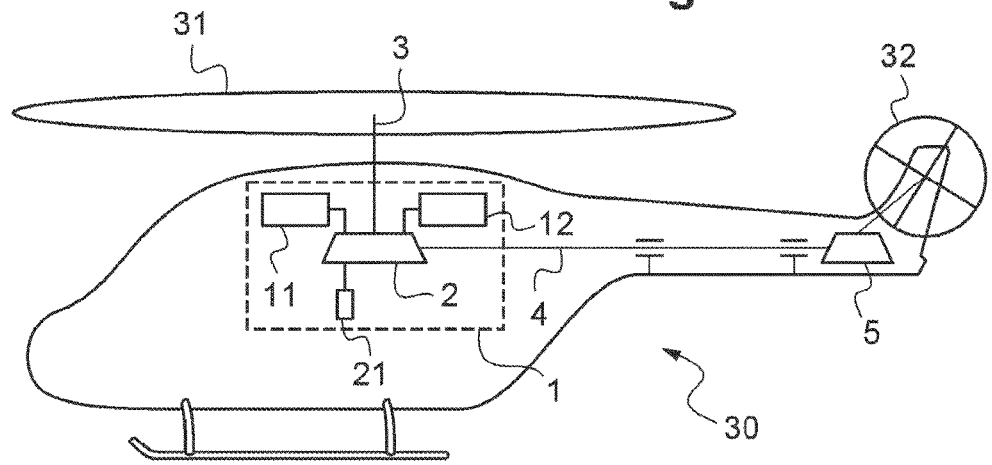
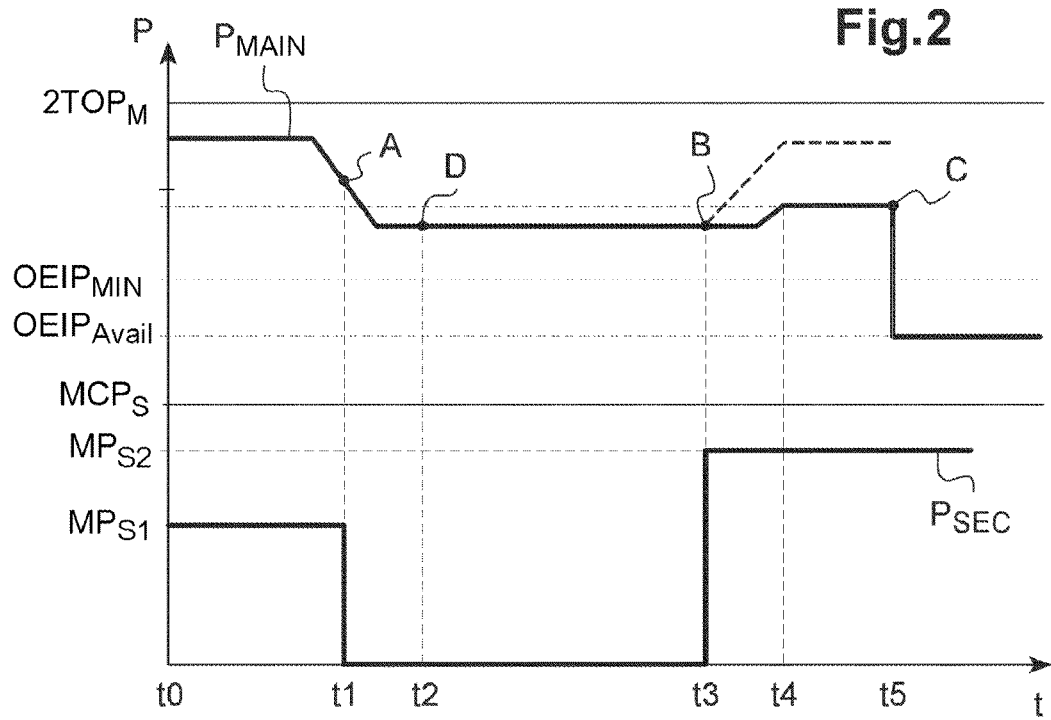

POWER PLANT INCLUDING A SECONDARY ENGINE FOR COMPENSATING FOR LOSSES OF POWER FROM MAIN ENGINES IN A ROTARY WING AIRCRAFT

CROSS REFERENCE TO RELATED APPLICATION

This application claims priority to French patent application No. FR 13 03052 filed on Dec. 20, 2013, the disclosure of which is incorporated in its entirety by reference herein.

BACKGROUND OF THE INVENTION (1) Field of the Invention

The present invention lies in the field of power plants for rotary wing aircraft, and more particularly rotary wing aircraft having a plurality of engines.

The present invention relates to a power plant for a rotary wing aircraft and to a rotary wing aircraft having said power plant, and it also relates to a method of managing such a power plant.

(2) Description of Related Art

A power plant for a rotary wing aircraft generally comprises one or two engines and a main power transmission gearbox (MGB). Each engine drives the MGB mechanically in order to rotate at least one main outlet shaft of the MGB. The main outlet shaft is constrained to rotate with a main rotor of the rotary wing aircraft in order to provide the aircraft with lift, and possibly also with propulsion.

The MGB generally has secondary outlet shafts, e.g. for driving rotation of a tail rotor or indeed of one or two propulsion propellers via one or more auxiliary gearboxes, and also for driving an electricity generator and/or hydraulic systems. The respective frequencies of rotation of these secondary outlet shafts are generally different from the frequency of rotation of the main outlet shaft.

It should be observed that the term "engine" is used to mean any power unit suitable for driving said MGB mechanically, and consequently suitable for contributing to providing the rotary wing aircraft with lift and/or propulsion via the main rotor. Such engines may for example be turboshaft engines of rotary wing aircraft.

An aircraft may also have an auxiliary power unit (APU). By way of example, the APU may be used for generating electricity or for driving hydraulic systems. However the APU does not drive the MGB, nor does it drive a rotor on a rotary wing aircraft.

Consequently, the APU of an aircraft does not constitute an engine in the meaning of the invention.

It is nowadays common practice to use a power plant on board rotary wing aircraft that comprises a plurality of engines and more particularly two engines, each engine being controlled by a dedicated control unit. The engines are generally identical.

Engines are said to be "identical" when they present characteristics for driving a rotary member, such as frequency of rotation, power, and/or torque that are identical.

Known Documents U.S. Pat. No. 4,177,693 and U.S. Pat. No. 3,963,372 describe respective power plants, each having three engines driving an MGB, all three engines being identical. More particularly, Document U.S. Pat. No. 3,963,372 proposes a solution for managing and controlling the power of its three engines.

Also known is Document WO 2012/059671, which proposes a power plant having two engines with different available maximum powers.

Furthermore, Document US 2009/0186320 describes an aircraft having a power plant with three engines that is used for training pilots and for simulating a total failure of an engine in various flight configurations. That system serves in particular to adapt the power available from a power plant as a function of the total weight of the aircraft.

Also, Document EP 2 724 939 describes a hybrid power plant having at least two fuel-burning engines and one electric motor, the electric motor being capable of compensating for a loss of power from a fuel-burning engine as a result of that engine failing.

Finally, Documents EP 2 623 746, EP 2 623 747, and EP 2 623 748 are known, which describe how to determine a power margin for an engine by performing a health check on that engine.

Within a power plant, regardless of the number of the engines that it includes, each turboshaft engine may operate at an ordinary rating during cruising flight. This ordinary rating is sometimes referred to as its maximum continuous power (MCP) rating, specifying the maximum power the engine can deliver continuously without limit on duration.

Furthermore, each engine may also operate at special ratings that are used during particular stages of operation of the rotary wing aircraft. In particular, during the stage of a rotary wing aircraft taking off, each engine operates at a takeoff rating which associates a maximum takeoff power (TOP) with a duration of use that is restricted. The maximum takeoff power TOP is greater than the maximum continuous power MCP.

In addition, when a power plant has at least two engines, it is overdimensioned so as to enable flight to be performed safely in the event of one engine failing. Specific emergency or "contingency" ratings are used, e.g. on twin-engined aircraft, when one of the engines has failed and thus delivers no power. These emergency ratings are referred to as one engine inoperative (OEI) ratings.

A first emergency rating known as OEI 30 sec thus specifies a supercontingency power that the engine that is still operational can deliver for a duration of about thirty consecutive seconds.

A second specific emergency rating known as OEI 2 min likewise specifies a maximum contingency power that the engine that is still operational can deliver for a duration of the order of two minutes.

A third specific emergency rating known as OEI cont specifies an intermediate contingency power that the engine that is still operational can continue to deliver for a duration lasting to the end of a flight.

A characteristic of an engine may be a guaranteed minimum OEI emergency mechanical power $OEIP_{MIN}$, i.e. the minimum power that the engine must be capable of delivering in OEI emergency mode. Consequently, the OEI powers associated with each of the emergency ratings OEI 30 sec, OEI 2 min, and OEI cont are all greater than or equal to a guaranteed minimum OEI emergency mechanical power $OEIP_{MIN}$.

The OEI emergency mechanical powers developed while those specific emergency ratings are in use need to be greater than the powers developed while using the ordinary rating in order to compensate for the power that is lost as a result of one failure of an engine. The guaranteed minimum OEI emergency mechanical power $OEIP_{MIN}$ is thus greater than the maximum continuous power MCP.

Thus, engines need to be overdimensioned in order to comply with safety requirements and to be capable of delivering extra power in the event of an engine failing. The engines then generally co-operate with an engine control unit (ECU).

Furthermore, the use of the OEI emergency ratings for the recommended durations is associated with predefined maintenance operations. Even if making use of these OEI emergency ratings fall within the design specifications of such an engine, the powers that they develop are considerably greater than the maximum continuous power MCP. Consequently, maintenance must be performed after using any of these OEI emergency ratings, in particular in order to check the state of the engine and of its components. In addition, using those OEI emergency ratings for durations longer than the recommended durations can lead to degradations in the engine that then require maintenance operations of greater magnitude.

Consequently, the use of the OEI emergency ratings, which are thus followed by maintenance operations of greater or smaller magnitude, has a direct maintenance cost (DMC) that may be high.

This DMC takes account of all of the costs associated with using and running the engine. This DMC is thus an important element in the cost of operating a rotary wing aircraft.

Furthermore, for an engine, this DMC depends on the utilization rate of the engine. An engine that is used at 50% of its maximum continuous power MCP presents, for example, a DMC that is less than an engine that is used at 100% of its MCP. This difference in the DMC depends in particular on the stressing of the components of the engine, and more particularly on the rotary components that wear more quickly when the engine is used at high power, thus likewise leading to maintenance operations being performed more frequently.

In addition, an engine may also suffer degradations during its lifetime that have an impact on its characteristics. Such an engine nevertheless continues to deliver power even though that power might be reduced.

By way of example, one kind of degradation that a rotary wing aircraft engine might suffer is the appearance of defects in at least one component of the engine, or else ingestion of a foreign object by the engine. Such ingestion of a foreign object is frequently referred to as foreign object damage (FOD).

Those degradations, although they do not lead to a total loss of the mechanical power delivered by an engine, nevertheless degrade its operation and limit the power it can deliver. For example, the engine may be able to deliver power continuously that is equal to the maximum continuous power MCP, but it may no longer be able to reach, even temporarily, an OEI emergency power that is greater than or equal to the guaranteed minimum emergency mechanical power $OEIP_{MIN}$.

The engine then requires maintenance in order to repair the degradations it has suffered and in order to enable it once more to deliver OEI emergency powers that are greater than or equal to the guaranteed minimum emergency mechanical power $OEIP_{MIN}$. Such degradations, and more particularly the maintenance operations used for correcting them, thus increase the DMC of the engine.

Nevertheless, the engine can be still be used in spite of its degradations but with a lower level of power available from the engine. The flight envelope of the rotary wing aircraft may then be reduced in order to take account of this drop in the power available from the engine, while still guaranteeing safe flight. Likewise, the total weight of the rotary wing aircraft is generally reduced in order to take account of this drop in the power available from the engine, with this reduction in the total weight of the aircraft being obtained by reducing the payload it transports.

Finally, an engine also suffers a loss of power as a result of aging. Throughout the lifetime of the engine and its utilization, all of its components suffer wear and they might possibly become deformed as a result of the thermal stresses to which they are subjected. As a result, beyond a certain degree of aging, the engine can no longer deliver, even on a temporary basis, an OEI emergency power that is greater than or equal to the guaranteed minimum emergency mechanical power $OEIP_{MIN}$ for which it is designed.

The maintenance operations performed on the engine throughout its lifetime enable it to be kept in form and enable certain components to be replaced, if necessary, in order to maintain the characteristics of the engine at a satisfactory level. Consequently, the engine operates reliably, but as from a certain degree of aging, it operates with loss in terms of the emergency mechanical power that it is capable of delivering compared with the guaranteed minimum emergency mechanical power $OEIP_{MIN}$. These maintenance operations also have an impact on the DMC of the engine.

Furthermore, executing these maintenance operations that result from such degradations of the engine takes the rotary wing aircraft out of service, so it is then not available to perform a flight.

In addition, in order to characterize the effects of such degradations and/or of the aging of an engine, each engine is regularly subjected to engine health checks, also referred to as engine power checks (EPCs). These engine health checks serve to monitor the performance of an engine by means of monitoring parameters representative of the degradation of the engine.

An engine health check is thus performed by comparing the performance of the engine with the performance of the same engine as obtained on a test bench and as declared by the manufacturer. An engine health check serves to determine respective margins for one or more monitoring parameters of the engine relative to limit values for each monitoring parameter, and consequently makes it possible to determine the mechanical powers that are available, such as the maximum continuous power MCP and the OEI emergency powers. Furthermore, it is possible to deduce from these monitoring parameters whether the engine has suffered degradations and whether it needs to be subjected to maintenance operations, in particular in order to be capable once more of delivering the mechanical powers for which it is appropriate.

An engine health check thus makes it possible to determine firstly the current characteristics of the engine and secondly whether the engine needs to be subjected to one or more maintenance operations.

For example, if the engine is a turboshaft engine having a high pressure turbine arranged upstream from a free turbine, one monitoring parameter may be the temperature of the gas at the inlet to the free turbine. Another monitoring parameter relating to the power delivered by the turboshaft engine may be the speed of rotation of the gas generator of the engine, which is substantially proportional to the power or to the torque that the engine delivers.

In addition, the monitoring parameters may depend on various criteria such as the speed of rotation of the engine used, engine stabilization conditions, or indeed atmospheric conditions, and each engine health check needs to be performed using a predetermined procedure.

Such an engine health check may be performed while in flight, or between two flights. Furthermore, such an engine health check is performed on a regular basis, e.g. once every twenty hours of engine operation.

BRIEF SUMMARY OF THE INVENTION

An object of the present invention is thus to propose a power plant for a rotary wing aircraft that makes it possible to reduce the direct maintenance costs of each engine in the power plant and to limit the down time of the aircraft to which the engine is fitted, but without limiting the performance of the power plant, and consequently the performance of the aircraft.

According to the invention, a power plant for a rotary wing aircraft has at least two main engines, at least one secondary engine, and a main power transmission gearbox (MGB). The main and secondary engines drive the MGB mechanically in order to rotate at least one main outlet shaft from the MGB, this main outlet shaft being suitable for being constrained to rotate with a main rotor of the aircraft.

Each main engine is capable of delivering continuously a first main mechanical power that is less than or equal to a maximum continuous main mechanical power $MCP_M$ and of delivering temporarily an emergency second main mechanical power that is greater than or equal to a guaranteed minimum emergency main mechanical power $OEIP_{MIN}$.

Each secondary engine is capable of continuously delivering a secondary mechanical power that is less than or equal to a maximum continuous secondary mechanical power $MCP_S$.

This power plant is remarkable in that each secondary engine can deliver two distinct secondary mechanical power levels during a flight of the aircraft. The secondary mechanical power delivered by each secondary engine thus enables each main engine and each secondary engine together to deliver mechanical power that is sufficient to ensure that the aircraft flies via the main rotor and consequently that is sufficient for maintaining the flight performance of the aircraft unchanged.

The two secondary mechanical power levels are a first secondary mechanical power $MP_{S1}$ and a second secondary mechanical power $MP_{S2}$. The second secondary mechanical power $MP_{S2}$ is greater than the first secondary mechanical power $MP_{S1}$ such that:

$$MP_{S2} = MP_{S1} + K \cdot P_{det}$$

where K is a coefficient greater than or equal to the value zero, $P_{det}$ being a predetermined main mechanical power value, and "·" being the multiplication function. The second secondary mechanical power $MP_{S2}$ thus serves to compensate for a loss of main mechanical power from at least one main engine.

The coefficient K may be referred to as a rating variation factor (RVF), which may be thought of as a power limit variation coefficient.

When each main engine is operating properly, the main engines together are capable of delivering sufficient mechanical power to ensure that the aircraft can fly in complete safety. In contrast, when a main engine suffers one or more degradations, the main mechanical power that it delivers may be reduced or indeed limited, with a greater or smaller loss of main mechanical power possibly resulting from each degradation as mentioned above. Likewise, the aging of a main engine is accompanied by a greater or smaller loss of main mechanical power.

Consequently, starting from a certain level of main mechanical power loss, a first main engine can no longer deliver, even on a temporary basis an emergency second main mechanical power that is greater than or equal to the guaranteed minimum emergency main mechanical power $OEIP_{MIN}$. Consequently, in the event of a second main engine of the power plant of the invention failing, the first main engine is no longer capable of delivering an OEI emergency second main mechanical power that is sufficient to compensate for the failure of the second main engine.

In other words, the main engines together can no longer deliver sufficient mechanical power to ensure that the aircraft flies in complete safety.

Any main engine that has suffered such a significant loss of emergency main mechanical power must therefore be subjected to a maintenance operation, or else the performance of the aircraft using that main engine must be reduced in order to be able to carry out a flight in complete safety. Reducing the performance of a rotary wing aircraft essentially relies on reducing the flight envelope of the aircraft and/or reducing the total weight of the aircraft.

Each secondary engine of the power plant of the invention makes it possible to deliver a second secondary mechanical power $MP_{S1}$ for compensating the loss of emergency main mechanical power from the first main engine due to degradations of this main engine and/or to its aging. This second secondary mechanical power serves at least to compensate for the shortfall in emergency main mechanical power between the emergency second main mechanical power and the guaranteed minimum emergency main mechanical power $OEIP_{MIN}$. Thus, the power plant can act via the main engines and the secondary engines to deliver sufficient mechanical power to ensure flight in complete safety for the rotary wing aircraft.

In an aircraft in which at least one first main engine has suffered a loss of emergency main mechanical power and at least one second main engine has suffered a failure, the power plant of the invention advantageously enables that aircraft to undertake flights without affecting maintenance operations on the power plant and without reducing its performance.

Consequently, the power plant of the invention enables the availability of the aircraft to be increased by avoiding the need to perform such maintenance operations immediately. The power plant of the invention also makes it possible to reduce the direct maintenance costs of the aircraft.

The failure of a main engine may be detected by means of an ECU co-operating with the main engine. An engine computer known as a full authority digital engine controller (FADEC) may take the place of the ECU.

The second secondary mechanical power $MP_{S2}$ of a secondary engine is given by the following formula:

$$MP_{S2} = MP_{S1} + K \cdot P_{det}$$

where $MP_{S1}$ is a first secondary mechanical power of the secondary engine, K is a coefficient greater than or equal to the value zero, $P_{det}$ is a predetermined main mechanical power, and "·" is the multiplication function.

Each secondary engine can thus deliver two distinct secondary mechanical power levels during a flight of the aircraft, firstly a first secondary mechanical power $MP_{S1}$ and secondly a second secondary mechanical power $MP_{S2}$. The second secondary mechanical power $MP_{S2}$ is greater than the first secondary mechanical power $MP_{S1}$ when the coefficient K is strictly positive in order to compensate for a loss of emergency second main mechanical power from a main engine.

The secondary engine is used to the needed extent by adapting the secondary mechanical powers $MP_{S1}$, $MP_{S2}$, and as a result its maintenance operations are reduced.

Furthermore, the second secondary power $MP_{S2}$ is limited by the maximum continuous secondary mechanical power $MCP_S$. The secondary engine can deliver a second secondary power $MP_{S2}$ greater than the maximum continuous secondary mechanical power $MCP_S$ without risk of degradation and the coefficient K is consequently likewise limited.

However, the first secondary mechanical power $MP_{S1}$ is a power that is predefined so that each secondary engine is more reactive when called on to deliver the second secondary mechanical power $MP_{S2}$. This first secondary mechanical power $MP_{S1}$ is preferably a constant power.

This first secondary mechanical power $MP_{S1}$ may nevertheless be zero, in which case each secondary engine requires time to reach this second secondary mechanical power $MP_{S2}$ that is longer than the time it would have required if the first secondary mechanical power $MP_{S1}$ were not zero.

Advantageously, although the first secondary mechanical power $MP_{S1}$ is not zero, the secondary engine may end up not delivering any secondary power during certain particular stages of flight of the aircraft, particularly when the main engines are not heavily stressed.

This first secondary mechanical power $MP_{S1}$ is non-zero in order to enable the secondary engine to be reactive in the event of an engine failure and in order to be capable of delivering the second secondary power $MP_{S2}$ quickly. This applies in particular during stages of flight involving takeoff, landing, hovering, or indeed turning under high aerodynamic loads or while climbing rapidly, during which stages the main engines are heavily stressed and the reaction time must be short.

In contrast, during cruising flight, for example, the main engines are less stressed. As a result, if a failure of a main engine occurs, the reaction time can be longer before each still-functional main engine delivers its OEI emergency main mechanical power and before each secondary engine delivers its second secondary power $MP_{S2}$. Consequently, it is possible to stop each secondary engine or to cause it to idle during such stages of flight without compromising the flying safety of the aircraft.

The second secondary mechanical power $MP_{S2}$ is intended to compensate for a loss of the emergency second main mechanical power of a main engine relative to the guaranteed minimum emergency main mechanical power $OEIP_{MIN}$ of that main engine, so it is advantageous for this second secondary mechanical power $MP_{S2}$ to be determined in particular as a function of the guaranteed minimum emergency main mechanical power $OEIP_{MIN}$. Thus, in the general situation of a power plant comprising a plurality of main engines, the predetermined main mechanical power $P_{det}$ is the sum of the guaranteed minimum emergency main mechanical powers $OEIP_{MIN}$ from each of the main engines minus one. It is statistically unlikely that two main engines will fail simultaneously, so it is possible to consider the situation in which only one main engine has failed.

This coefficient K may be determined by a calculation unit present in the aircraft, and more particularly in the power plant. The calculation unit is preferably dedicated to the power plant, and it may then be referred to as a power management unit. Likewise, the second secondary mechanical power $MP_{S2}$ may also be determined by the calculation unit.

Nevertheless, the coefficient K and the second secondary mechanical power $MP_{S2}$ may be determined by the FADEC engine computer of the secondary engine in the particular situation in which the power plant has only one secondary engine, the FADEC engine computers of each of the engines of the power plant communicating together.

Advantageously, in the particular circumstance of a power plant having two identical main engines, the predetermined main mechanical power $P_{det}$ is the guaranteed minimum emergency main mechanical power $OEIP_{MIN}$ of a main engine.

Nevertheless, the predetermined main mechanical power $P_{det}$ may be a function of some other main mechanical power that is characteristic of a main engine, such as its maximum continuous main mechanical power $MCP_M$ or its maximum takeoff main mechanical power $TOP_M$. By way of example, the predetermined main mechanical power $P_{det}$ is a percentage of the maximum continuous main mechanical power $MCP_P$ of a main engine, such that $P_{det}=120\%$ of $MCP_M$ in the particular situation of a power plant having two identical main engines.

Likewise, the predetermined main mechanical power $P_{det}$ may be a percentage of the maximum takeoff main mechanical power $TOP_M$ of a main engine, such that $P_{det}=110\%$ of $TOP_M$ in the particular circumstance of a power plant having two identical main engines.

The second secondary mechanical power $MP_{S2}$, for compensating a loss of the emergency second main mechanical power of a main engine relative to the guaranteed minimum emergency main mechanical power $OEIP_{MIN}$ of that main engine, is less than the maximum continuous main power $MCP_M$ of each main engine. Each secondary engine may thus be of smaller dimensions than each main engine and the maximum continuous secondary mechanical power $MCP_S$ delivered by each secondary engine is less than the maximum continuous main mechanical power $MCP_M$ of each main engine.

Advantageously, the use of secondary engines of smaller dimensions than each main engine serves to limit the increase in the weight of the power plant, and consequently in the weight of the aircraft.

For example, the maximum continuous secondary mechanical power $MCP_S$ delivered by each secondary engine is of the order of 30% of the maximum continuous main mechanical power $MCP_M$ of a main engine. In this example, the first secondary mechanical power $MP_{S1}$ may be equal to 10% of the maximum continuous main mechanical power $MCP_M$ and the second secondary mechanical power $MP_{S2}$ then lies in the range 10% to 30% of this maximum continuous main mechanical power $MCP_M$.

Likewise, the first and second secondary mechanical powers $MP_{S1}$ and $MP_{S2}$ may correspond to a power limit of the secondary engine. Such power limits constitute power stops of the secondary engine in the same way as the OEI emergency powers associated with each of the emergency ratings OEI 30 sec, OEI 2 min, and OEI cont of the main engines, these stops generally being predetermined.

Preferably, the power plant of the invention has a plurality of main engines that may be identical together with a single secondary engine. Advantageously, the use of a single secondary engine, which may also be of smaller dimensions than each of the main engines, limits the effect on the weight of the power plant, and consequently on the weight of the aircraft.

Since the power plant of the invention is for a rotary wing aircraft, each main engine may be a turboshaft engine and each secondary engine may be a fuel-burning engine, e.g. a turboshaft engine, or indeed it may be an electric motor.

In a preferred embodiment of the invention, the power plant includes two identical main engines and a single secondary engine, the maximum continuous secondary mechanical power $MCP_S$ delivered by the secondary engine being less than the maximum continuous main power $MCP_P$ of each main engine.

The operating state of each main engine may be determined by an engine health check that needs to be performed regularly. Each engine health check serves to determine the level of degradation and/of aging of each main engine and also to determine a main mechanical power margin for each main engine.

The coefficient K used for determining the value of the second secondary power $MP_{S1}$ is preferably determined on the basis of this main mechanical power margin. This power margin may for example be positive when the main engine can deliver available power greater than or equal to a reference power, and negative when the main engine cannot deliver an available power greater than or equal to a reference power. This power margin may be expressed as a percentage.

The coefficient K is preferably given by the formula:

$$K=|\min[0, CSM_{P11}, CSM_{P12}]|$$

where $CSM_{P11}$ and $CSM_{P12}$ represent the respective power margins of each of the main engines, "0" represents the value zero, "min" represents a function returning the minimum value of a series of values, and "| |" is the absolute value function.

In addition, since the second secondary power $MP_{S2}$ is limited by the maximum continuous secondary mechanical power $MCP_S$, the coefficient K is also limited. For example, the coefficient K must remain less than a value of 0.2. When the coefficient K is not equal to zero, it corresponds to the power margin of a main engine that is negative, the main engine presenting a deficit in its emergency main mechanical power. If the absolute value of this negative power margin is too great, and consequently if the coefficient K is too great, that means that the loss of emergency main mechanical power from the main engine is large and can no longer be compensated by the secondary engine. Under such circumstances, the aircraft having this main engine must be taken out of service for maintenance or must fly with a reduced flight envelope, and/or a reduced total weight.

Furthermore, the power margin of a main engine may be a margin relating to the guaranteed minimum emergency main mechanical power $OEIP_{MIN}$ of the main engine as given by the formula:

$$CSM = \frac{OEIP_{Avail} - OEIP_{MIN}}{OEIP_{MIN}}$$

where $OEIP_{MIN}$ represents the guaranteed minimum emergency main mechanical power of this main engine and $OEIP_{Avail}$ represents an OEI emergency main mechanical power available from this main engine. This available emergency main mechanical power $OEIP_{Avail}$ from this main engine corresponds to the emergency second main mechanical power that this engine can genuinely deliver in its current state.

When this main engine can deliver an available emergency main mechanical power $OEIP_{Avail}$ that is greater than or equal to its guaranteed minimum emergency main mechanical power $OEIP_{MIN}$, then the power margin CSM is positive. Consequently, the coefficient K is equal to zero and the second secondary mechanical power $MP_{S2}$ is equal to the first secondary mechanical power $MP_{S1}$. Each secondary engine therefore has no need to deliver the second secondary mechanical power $MP_{S2}$, since each main engine can deliver an OEI emergency secondary main mechanical power that is sufficient in the event of one of the main engines failing.

In contrast, when a main engine can deliver only an available emergency main mechanical power $OEIP_{Avail}$ that is less than its guaranteed minimum emergency main mechanical power $OEIP_{MIN}$, then the power margin CSM is negative. Consequently, the coefficient K is equal to the absolute value of the smallest of the power margins CSM of the main engines. Each secondary engine then needs to deliver the second secondary mechanical power $MP_{S2}$ in order to compensate for the loss of emergency main mechanical power from at least one main engine in the event of a failure of another main engine.

Since each engine health check serves to determine the power margin CSM, and consequently the second secondary mechanical power $MP_{S2}$, this second secondary mechanical power $MP_{S2}$ is constant between two engine health checks on each of the main engines.

In addition, in a power plant having two or more main engines, the predetermined main mechanical power $P_{det}$ is associated with the main engine having the greatest deficit of emergency main mechanical power. This deficit of emergency main mechanical power is the product of the power margin CSM of the main engine under consideration multiplied by the guaranteed minimum emergency main mechanical power $OEIP_{MIN}$ of this engine under consideration, i.e. $CSM \times OEIP_{MIN}$.

In the particular situation of a power plant having identical main engines, the predetermined main mechanical power $P_{det}$ is associated with the main engine having the smallest main mechanical power margin $CSM_{P11}$, $CSM_{P12}$.

In a first variant of the invention, the second secondary mechanical power $MP_{S2}$ of each secondary engine may be an emergency secondary mechanical power. Under such circumstances, each secondary engine may have emergency secondary mechanical power that is greater than its maximum continuous mechanical power $MCP_S$. Nevertheless, this emergency secondary mechanical power requires maintenance operations to be performed on the secondary engine in a manner analogous to the use of an OEI emergency power on the main engines and therefore has an impact on the direct maintenance costs of the power plant. It can nevertheless be advantageous to use an emergency secondary mechanical power on a secondary engine, e.g. to compensate for the loss of emergency main power of a main engine. The maintenance operations required after using an emergency power on a secondary engine give rise to an increase in its direct maintenance costs, but that increase may be less than the cost of taking the aircraft out of service.

In a second variant of the invention, each secondary engine may deliver the second secondary mechanical power $MP_{S2}$ under the control of an operator, such as the pilot of the aircraft, and independently of a health check on each main engine. Thus, when necessary, the operator can benefit from additional mechanical power from the power plant, in order to guarantee the safety of the flight of the aircraft. For example, a drop in the main mechanical power from at least one main engine may be detected between two engine health checks. In another example, the pilot of the aircraft may temporarily require additional power from the power plant in order to benefit from a larger safety margin when performing particular maneuvers that require extra power, such as taking off or hovering with the aircraft at maximum weight or indeed for the purpose of enlarging its flight envelope. The operator may cause the second secondary mechanical power $MP_{S2}$ to be delivered by each secondary engine by using dedicated control means, and the pilot may also select the value of this second secondary mechanical power $MP_{S2}$.

The present invention also provides a rotary wing aircraft including at least one main rotor and a power plant as described above. The power plant drives the main rotor in rotation via a main mechanical transmission gearbox (MGB), the main rotor being constrained to rotate with a main outlet shaft of the MGB of the power plant. In addition, the aircraft may have a tail rotor or indeed at least one propulsive propeller. The tail rotor or indeed each propulsive propeller may likewise be driven in rotation by the MGB via a secondary outlet shaft and an auxiliary power transmission gearbox.

The present invention also provides a method of managing a power plant for a rotary wing aircraft, the power plant having at least two main engines, at least one secondary engine, and a main power transmission gearbox (MGB). The main and secondary engines drive the MGB mechanically in order to rotate at least one main outlet shaft of the MGB, the main outlet shaft being constrained to rotate with a main rotor of the aircraft.

Each main engine is capable of delivering continuously a first main mechanical power that is less than or equal to a maximum continuous main mechanical power $MCP_M$ and is capable of delivering temporarily an emergency second main mechanical power that is greater than or equal to a guaranteed minimum emergency main mechanical power $OEIP_{MIN}$. Each secondary engine is capable of delivering continuously a secondary mechanical power that is less than or equal to a maximum continuous secondary mechanical power $MCP_S$.

During this method of managing a power plant, the following steps are performed:

controlling each main engine to deliver a main mechanical power; and controlling each secondary engine to deliver two distinct mechanical power levels, the secondary mechanical power level delivered by each secondary engine enabling each main engine and each secondary engine to act together to deliver mechanical power that is greater than or equal to sufficient mechanical power for enabling the aircraft to fly using the main rotor, the two secondary mechanical power levels being a first secondary mechanical power $MP_{S1}$ and a second secondary mechanical power $MP_{S2}$, the second secondary mechanical power $MP_{S2}$ being greater than the first secondary mechanical power $MP_{S1}$ such that:

$$MP_{S2} = MP_{S1} + K \cdot P_{det}$$

K being a coefficient greater than or equal to the value zero, $P_{det}$ being a predetermined main mechanical power value and "·" being the multiplication function, the second secondary mechanical power $MP_{S2}$ thus serving to compensate for a loss of main mechanical power in at least one main engine.

Each main engine may be controlled via an engine control unit (ECU) co-operating with the main engine. Likewise, each secondary engine may be controlled by an ECU co-operating with the secondary engine. This ECU may be replaced by a FADEC engine computer.

Thus, maintenance operations on each main engine can be avoided, and consequently the direct maintenance cost of each main engine is reduced. Furthermore, since each secondary engine compensates for losses of emergency main mechanical power from each main engine, the flight performance of the aircraft is maintained unchanged. Likewise, the availability of the aircraft is improved, the power plant of the invention enabling maintenance operations to be postponed without degrading the flight performance of the aircraft.

The predetermined main mechanical power $P_{det}$ is preferably the guaranteed minimum emergency main mechanical power $OEIP_{MIN}$ of a main engine.

The predetermined main mechanical power $P_{det}$ may also be a function of some other main power that is characteristic of a main engine, such as its maximum continuous main mechanical power $MCP_M$ or indeed its maximum takeoff main mechanical power $TOP_M$.

Furthermore, during this method of managing the power plant, the following steps may be performed:

performing an engine health check on each main engine determining a level of degradation of each main engine and a main mechanical power margin $CSM_{P11}$, $CSM_{P12}$ for each main engine;

determining the coefficient K such that:

$$K = |\min[0, CSM_{P11}, CSM_{P12}]|$$

$CSM_{P11}$ and $CSM_{P12}$ being the main mechanical power margins of each of the main engines respectively, "0" being the value zero, "min" being a function returning the minimum value from among a series of values, and "| |" being the absolute value function.

The operating state of each main engine is thus determined by an engine health check that is performed regularly. Each engine health check serves to determine the level of degradation and/or of aging of each main engine and to determine the power margin $CSM_{P11}$, $CSM_{P12}$ of each main engine. Each secondary engine then compensates for losses in the emergency main mechanical power of each main engine.

This power margin $CSM_{P11}$, $CSM_{P12}$ of a main engine may be a margin relative to the guaranteed minimum emergency main mechanical power $OEIP_{MIN}$ of the main engine in application of the following formula:

$$CSM = \frac{OEIP_{Avail} - OEIP_{MIN}}{OEIP_{MIN}}$$

where $OEIP_{MIN}$ represents the guaranteed minimum emergency main mechanical power of the main engine and $OEIP_{Avail}$ is represents the OEI emergency main mechanical power that is available from this main engine. This available main mechanical power $OEIP_{Avail}$ of this main engine corresponds to the second emergency main mechanical power that this main engine can genuinely deliver in its current state.

Finally, during this method of managing the power plant: each secondary engine is controlled so that said secondary mechanical power is zero when said aircraft is in cruising flight.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 shows a rotary wing aircraft fitted with a power plant of the invention; and FIG. 2 is a diagram plotting curves showing the powers delivered by the engines of the power plant.

Elements shown in more than one of the figures are given the same references in each of them.

DETAILED DESCRIPTION OF THE INVENTION

FIG. 1 shows a rotary wing aircraft 30 having a main rotor 31, a tail rotor 32, and a power plant 1. The power plant 1 has two identical main engines 11 and 12, a secondary engine 21, and a main power transmission gearbox (MGB) 2. The main engines 11 and 12, and the secondary engine 21 may act together to drive the MGB 2 so as to rotate a main outlet shaft 3 from the MGB 2. This main outlet shaft 3 is constrained to rotate with the main rotor 31 so as to provide the aircraft 30 with lift and propulsion.

The tail rotor 32 may also be driven in rotation by the MGB 2 via a secondary outlet shaft 4 from the MGB 2 and an auxiliary gearbox 5.

By way of example, the main engines 11 and 12 are turboshaft engines, each comprising a gas generator and a free turbine that drives the MGB 2. The secondary engine 21 may be a turboshaft engine, or it may be an electric motor. Furthermore, the secondary engine 21 is of smaller dimensions than either of the main engines 11 and 12.

Each main engine 11, 12 is capable of delivering continuously a first main mechanical power that is less than or equal to a maximum continuous main mechanical power $MCP_M$ and of delivering in temporary manner an emergency second main mechanical power that is greater than or equal to a minimum guaranteed emergency main mechanical power $OEIP_{MIN}$. Each secondary engine 21 delivers continuously a secondary mechanical power that is less than or equal to a maximum continuous secondary mechanical power $MCP_S$. The secondary engine 21 is of smaller dimensions than each main engine 11, 12, and the maximum continuous secondary mechanical power $MCP_S$ is less than the maximum continuous main mechanical power $MCP_M$.

The secondary engine 21 can deliver two distinct secondary mechanical power levels, a first secondary mechanical power $MP_{S1}$ and a second secondary mechanical power $MP_{S2}$, the second secondary mechanical power $MP_{S2}$ being greater than the first secondary mechanical power $MP_{S1}$.

When both of the main engines 11 and 12 are operating normally, i.e. so that each main engine 11, 12 can deliver in continuous operation a first main mechanical power that is equal to the maximum continuous main mechanical power $MCP_M$ and can deliver temporarily an emergency second main mechanical power that is greater than or equal to the guaranteed minimum emergency main mechanical power $OEIP_{MIN}$, the main engines 11 and 12 suffice on their own to ensure that the aircraft 30 flies in complete safety, and in particular even in the event of one of the main engines failing.

In contrast, when a main engine 11, 12 cannot deliver an emergency second main mechanical power that is greater than or equal to the guaranteed minimum emergency main mechanical power $OEIP_{MIN}$, then the secondary engine 21 is used to deliver a second secondary mechanical power $MP_{S2}$. The two main engines 11 and 12 together with the secondary engine 21 thus deliver sufficient mechanical power to enable the aircraft 30 to fly in complete safety following a failure of a main engine. The second secondary mechanical power $MP_{S2}$ thus compensates for the loss of the main mechanical power of a main engine 11, 12 relative to its guaranteed minimum emergency main mechanical power $OEIP_{MIN}$.

As a result, the use of the secondary engine 21 enables the flight performance of the aircraft 30 to be kept unchanged, even though one of the two main engines 11 and 12 cannot deliver a second main mechanical power that is greater than or equal to the minimum guaranteed emergency main mechanical power $OEIP_{MIN}$.

A main engine 11, 12 may suffer a loss of emergency main mechanical power as a result of one or more degradations suffered by the main engine 11, 12 or indeed as a result of the main engine 11, 12 aging.

By way of example, such degradations may comprise the appearance of defects in at least one component of the main engine 11, 12, or indeed the main engine 11, 12 ingesting a foreign object. Even though such degradations do not lead to a total loss of mechanical power delivered by the main engine 11, 12, they degrade its operation and limit the mechanical power it can deliver. Provision should then be made to maintain the main engine 11, 12 in question in order to repair the degradations of that engine and enable it once more to deliver an emergency second main mechanical power that is greater than or equal to the minimum guaranteed emergency main mechanical power $OEIP_{MIN}$. Such degradations, and more particularly the maintenance operations for correcting them, thus increase the direct cost of maintaining the main engine 11, 12. Furthermore, such maintenance operations take the aircraft 30 out of service on the ground or else the aircraft 30 performs flight with a reduction of its flight envelope or of its total weight.

Advantageously, the secondary engine 21 of the power plant 1 can deliver the second secondary mechanical power $MP_{S2}$ to compensate for this loss of emergency main mechanical power of a main engine 11, 12, thus enabling the aircraft 30 to continue its flight safely. As a result, the direct cost of maintenance on these main engines 11, 12, and consequently on the aircraft 30 can be reduced by using the secondary engine 21, it being possible to omit maintenance operations on the main engines 11, 12 since the flight performance of the aircraft 30 is not degraded. Furthermore, the aircraft 30 thus continues to remain available for performing flights without degraded performance.

Such a loss of the main mechanical power delivered by a main engine 11, 12 is generally revealed while performing a health check on the engine, where such checks need to be performed regularly on each main engine 11, 12. This engine health check verifies the operating state of each main engine 11, 12 and makes it possible to determine a main mechanical power margin CSM for each main engine 11, 12.

After performing such an engine health check on each main engine 11, 12 and discovering a loss of main mechanical power delivered by at least one main engine 11, 12, each main engine 11, 12 may be required to undergo maintenance operations.

The main mechanical power margin of a main engine 11, 12 may be written as follows:

$$CSM = \frac{OEIP_{Avail} - OEIP_{MIN}}{OEIP_{MIN}}$$

where $OEIP_{MIN}$ represents the guaranteed minimum emergency main mechanical power of the main engine in question and $OEIP_{Avail}$ representing an OEI emergency main mechanical power available from this main engine corresponds to the power that this main engine 11, 12 can genuinely deliver in its current state. This power margin CSM is thus positive when the main engine 11, 12 possesses an available emergency main mechanical power $OEIP_{Avail}$ that is greater than or equal to the guaranteed minimum emergency main mechanical power $OEIP_{MIN}$ of this main engine, and negative otherwise.

This power margin $CSM_{P11}$, $CSM_{P12}$ of a main engine 11, 12 then makes it possible to determine the second secondary mechanical $MP_{S2}$ power using the following formula:

$$MP_{S2} = MP_{S1} + K \cdot P_{det}$$

where $MP_{S1}$ is a first secondary mechanical power predefined for the secondary engine, K is a coefficient greater than or equal to zero, and $P_{det}$ is a predetermined main mechanical power value.

The coefficient K is given by the formula:

$$K = |\min[0, CSM_{P11}, CSM_{P12}]|$$

where $CSM_{P11}$ and $CSM_{P12}$ represent respectively the main mechanical power margin of each of the main engines 11, 12, and where "min" represents a function that returns the minimum value of a series of values. Specifically, the coefficient K is equal to zero when both main engines 11, 12 have an available emergency main mechanical power $OEIP_{Avail}$ that is greater than or equal to its guaranteed minimum emergency main mechanical power $OEIP_{MIN}$, and it is positive when at least one of the main engines 11, 12 has available emergency main mechanical power $OEIP_{Avail}$ that is less than its guaranteed minimum emergency main mechanical power $OEIP_{MIN}$.

The graph of FIG. 2 plots, as a function of time, the secondary mechanical power levels of the secondary engine 21 together with the main mechanical power delivered by the two main engines 11 and 12 together.

The curve $P_{MAIN}$ represents the main mechanical power as delivered by the two main engines 11 and 12 together, and the curve $P_{SEC}$ represents the secondary mechanical power delivered by the secondary engine 21.

FIG. 2 also shows the maximum takeoff mechanical power $2TOP_M$ that can be delivered by the two main engines 11, 12 together, which is equal to twice the maximum takeoff main mechanical power $TOP_M$ from each of the main engines 11, 12, and it also shows the maximum continuous secondary mechanical power $MCP_S$ that can be delivered by the secondary engine 21.

By way of example, the first time interval $[t_0, t_1]$ corresponds to the aircraft 30 in a stage of taking off and gaining altitude up to a point A corresponding to beginning a stage of cruising flight. The curve $P_{SEC}$ represents a first secondary mechanical power $MP_{S1}$ that is constant. The curve $P_{MAIN}$ represents the main mechanical power delivered by the two main engines 11 and 12 together during the takeoff stage. The sum of these two powers $P_{MAIN}$ plus $P_{SEC}$ thus enables the aircraft to perform this takeoff stage safely.

The secondary engine 21 delivers a first secondary mechanical power $MP_{S1}$ since the most recent engine health check to have been performed did not reveal any loss of emergency main power by either of the main engines 11 and 12, so the power margin $CSM_{P11}$, $CSM_{P12}$ of each of the main engines 11, 12 is positive.

By way of example, the second time interval $[t_1, t_3]$ corresponds to a stage of cruising flight from point A to point B. This stage of cruising flight requires less mechanical power from the power plant 1. The main mechanical power $P_{MAIN}$ delivered by the two main engines 11 and 12 together may be reduced. Furthermore, the secondary engine 21 may be stopped or caused to idle so that it delivers no secondary mechanical power.

During this stage of cruising flight, an engine health check is performed at time $t_2$ corresponding to point D on the curve $P_{MAIN}$. This engine health check reveals a negative power margin $CSM_{P11}$, $CSM_{P12}$. The secondary engine 21 must therefore deliver a second secondary power $MP_{S2}$ in order to compensate for the corresponding loss of emergency main mechanical power in the event of a failure of a main engine 11, 12.

Nevertheless, since the aircraft 30 is still in a stage of cruising flight, the secondary engine 21 remains stopped or idling and delivers no secondary mechanical power. If a failure were to occur on a main engine 11, 12 during this stage of cruising flight, the secondary engine 21 would have sufficient reaction time to reach the second secondary power $MP_{S2}$ without endangering the safety of the flight.

Thereafter, the aircraft 30 leaves the stage of cruising flight at point B (time $t_3$) in order to enter a stage of flight that is more demanding in terms of power, such as a landing stage or a hovering stage. The secondary engine 21 then delivers the second secondary power $MP_{S2}$ in compliance with the most recently-performed engine health check. Advantageously, since both main engines 11, 12 are functional they can deliver reduced power given that the secondary engine 21 is delivering secondary power that is increased compared with the takeoff stage.

As from point B, the dashed-line curve $P_{MAIN}$ represents the main mechanical power that the two main engines 11 and 12 would deliver if the secondary engine 21 were delivering the first secondary mechanical power $MP_{S1}$. The continuous-line curve $P_{MAIN}$ represents the main mechanical power delivered by the two main engines 11 and 12 while the secondary engine 21 is delivering the second secondary mechanical power $MP_{S2}$. This main mechanical power $P_{MAIN}$ is thus smaller, thereby enabling the main engines 11 and 12 to be stressed less severely, and consequently enabling their direct maintenance costs to be reduced a little. It can be more advantageous to stress the secondary engine 21 which is of smaller dimensions and which may have a direct maintenance cost that is lower.

Thereafter, at point C (time $t_5$), a failure of a main engine 11, 12 occurs. Only one main engine 11, 12 is then delivering a main mechanical power, specifically an OEI emergency main mechanical power. Furthermore, this OEI emergency main mechanical power is less than its guaranteed minimum emergency main mechanical power $OEIP_{MIN}$. Advantageously, the secondary engine 21 which was already delivering the second secondary mechanical power $MP_{S2}$ compensates for this deficiency in OEI emergency main mechanical power so as to guarantee safe flight.

Furthermore, the secondary engine 21 continues to deliver this second secondary mechanical power $MP_{S2}$ until the next engine health check or until the next maintenance operation on the main engine 11, 12.

The power plant 1 of the invention thus enables the performance of the power plant 1 to be maintained unchanged, and consequently enables the flight performance of the aircraft 30 to remain unchanged, while nevertheless reducing the maintenance operations on each of the main engines 11, 12.

Consequently, the direct maintenance cost of each main engine 11, 12 can be reduced without putting a limit on the performance of the power plant 1, and consequently on the performance of the aircraft 30.

Advantageously, the secondary engine 21 is used only as much as necessary by adapting the secondary mechanical powers $MP_{S1}$, $MP_{S2}$, so its maintenance cost is kept down to a minimum.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of managing a power plant for a rotary wing aircraft, the power plant comprising at least two main engines, at least one secondary engine, and a main power transmission gearbox (MGB), the main and secondary engines driving the MGB mechanically in order to rotate at least one main outlet shaft the MGB, the main outlet shaft being constrained to rotate with a main rotor of the aircraft, each main engine being capable of delivering continuously a first main mechanical power that is less than or equal to a maximum continuous main mechanical power $MCP_M$ and of delivering temporarily an emergency second main mechanical power that is greater than or equal to a guaranteed minimum emergency main mechanical power $OEIP_{MIN}$, each secondary engine being capable of delivering continuously a secondary mechanical power that is less than or equal to a maximum continuous secondary mechanical power $MCP_S$, the method being characterized by the following steps:

performing an engine health check on each main engine determining a level of degradation of each main engine and a main mechanical power margin $CSM_{P11}$, $CSM_{P12}$ for each main engine;

determining a coefficient K as being greater than or equal to zero where:

$$K=|min[0,CSM_{P11},CSM_{P12}]|$$

$CSM_{P11}$ and $CSM_{P12}$ being the main mechanical power margins of each of the main engines respectively, "0" being the value zero, "min" being a function returning the minimum value from among a series of values, and "| |" being the absolute value function;

controlling each main engine to deliver a main mechanical power; and controlling each secondary engine to deliver two distinct mechanical power levels, the secondary mechanical power level delivered by each secondary engine enabling each main engine and each secondary engine to act together to deliver mechanical power that is greater than or equal to sufficient mechanical power SMP for enabling the aircraft to fly using the main rotor, the two secondary mechanical power levels being a first secondary mechanical power $MP_{S1}$ and a second secondary mechanical power $MP_{S2}$, the second secondary mechanical power $MP_{S2}$ being:

$$MP_{S2}=MP_{S1}K\cdot P_{det}$$

where $P_{det}$ is a predetermined main mechanical power value and "·" is the multiplication function, the second secondary mechanical power $MP_{S2}$ thus serving to compensate for a loss of main mechanical power in at least one main engine.

2. The method according to claim 1 for managing a power plant, wherein the maximum continuous secondary mechanical power $MCP_S$ delivered by each secondary engine is less than the maximum continuous main power $MCP_P$ of each main engine.

3. The method according to claim 1 for managing a power plant, wherein the main mechanical power margin $CSM_{P11}$, $CSM_{P12}$ of a main engine is a margin relating to the guaranteed minimum emergency main mechanical power $OEIP_{MIN}$ of each main engine such that:

$$CSM_{P11} = \frac{OEIP_{Avail} - OEIP_{MIN}}{OEIP_{MIN}}$$

where $OEIP_{MIN}$ is the guaranteed minimum emergency main mechanical power of the main engine, and $OEIP_{Avail}$ is an available emergency main mechanical power of the main engine.

4. The method according to claim 1 for managing a power plant, wherein the predetermined main mechanical power $P_{det}$ is the guaranteed minimum emergency main mechanical power $OEIP_{MIN}$ of a main engine.

5. The method according to claim 1 for managing a power plant, wherein the predetermined main mechanical power $P_{det}$ is a percentage of the maximum continuous main mechanical power $MCP_P$ of a main engine.

6. The method according to claim 1 for managing a power plant, wherein each main engine possesses a maximum takeoff main mechanical power $TOP_M$ and the predetermined main mechanical power $P_{det}$ is a percentage of the maximum takeoff main mechanical power $TOP_M$ of a main engine.

7. The method according to claim 1 for managing a power plant, wherein the predetermined main mechanical power $P_{det}$ is associated with the main engine having the smallest the main mechanical power margin $CSM_{P11}$, $CSM_{P12}$.

8. The method according to claim 1 for managing a power plant, wherein an operator can control each secondary engine to deliver the second secondary mechanical power $MP_{S2}$.

9. The method according to claim 1 for managing a power plant, wherein the second secondary mechanical power $MP_{S2}$ of each secondary engine may be an emergency secondary mechanical power.

10. The method according to claim 1 for managing a power plant, wherein the second secondary mechanical power $MP_{S2}$ is constant between two engine health checks of each main engine.

11. The method according to claim 1 for managing a power plant, wherein the first secondary mechanical power $MP_{S1}$ is constant.

12. The method according to claim 1 for managing a power plant, wherein the first and second secondary mechanical powers $MP_{S1}$, $MP_{S2}$ are power limits for each secondary engine.

13. The method according to claim 1 for regulating a power plant, wherein each secondary engine is controlled so that the secondary mechanical power is zero when the aircraft is in cruising flight.

14. The method according to claim 1 for managing a power plant, wherein the power plant has two identical main engines and only one secondary engine.

15. A power plant for a rotary wing aircraft, the power plant comprising at least two main engines, at least one secondary engine, at least one calculation unit, an engine control unit, and a main power transmission gearbox (MGB), the main and secondary engines driving the MGB mechanically in order to rotate at least one main outlet shaft of the MGB, the main outlet shaft being suitable for being constrained to rotate with a main rotor of the aircraft, each main engine being capable of delivering continuously a first main mechanical power that is less than or equal to a maximum continuous main mechanical power $MCP_M$ and of delivering temporarily an emergency second main mechanical power that is greater than or equal to a guaranteed minimum emergency main mechanical power $OEIP_{MIN}$, each secondary engine being capable of delivering continuously a secondary mechanical power that is less than or equal to a maximum continuous secondary mechanical power $MCP_S$, wherein said the engine control unit is configured to perform the method in accordance with claim 1 for managing the power plant.

16. A rotary wing aircraft including at least one main rotor and a power plant, the power plant driving the main rotor in rotation, wherein the power plant is a power plant in accordance with claim 15.

* * * * *